United States Patent
Gundlach

(10) Patent No.: US 11,402,016 B2
(45) Date of Patent: Aug. 2, 2022

(54) METHOD FOR OPERATING A MULTI-CLUTCH TRANSMISSION, MULTI-CLUTCH TRANSMISSION FOR A MOTOR VEHICLE, AND MOTOR VEHICLE HAVING A MULTI-CLUTCH TRANSMISSION

(71) Applicant: AUDI AG, Ingolstadt (DE)

(72) Inventor: Lutz Gundlach, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 692 days.

(21) Appl. No.: 16/346,572

(22) PCT Filed: Oct. 27, 2017

(86) PCT No.: PCT/EP2017/077680
§ 371 (c)(1),
(2) Date: May 1, 2019

(87) PCT Pub. No.: WO2018/083046
PCT Pub. Date: May 11, 2018

(65) Prior Publication Data
US 2020/0056698 A1 Feb. 20, 2020

(30) Foreign Application Priority Data
Nov. 4, 2016 (DE) ...................... 10 2016 221 698.8

(51) Int. Cl.
*F16H 61/12* (2010.01)
*F16H 61/688* (2006.01)
(Continued)

(52) U.S. Cl.
CPC .............. *F16H 61/12* (2013.01); *F16H 1/20* (2013.01); *F16H 61/688* (2013.01); *F16D 23/02* (2013.01);
(Continued)

(58) Field of Classification Search
CPC .. F16H 61/12; F16H 61/688; F16H 2059/465; F16H 2059/6807; F16D 23/02
(Continued)

(56) References Cited

U.S. PATENT DOCUMENTS

| 9,022,897 B2 * | 5/2015 | Maass | B60W 10/08 477/5 |
| 9,644,733 B2 * | 5/2017 | Gansohr | F16H 61/0202 |

(Continued)

FOREIGN PATENT DOCUMENTS

| CN | 103562600 A | 2/2014 |
| CN | 103619685 A | 3/2014 |

(Continued)

OTHER PUBLICATIONS

International Preliminary Report on Patentability and translation of Written Opinion dated May 16, 2019 in corresponding International Application No. PCT/EP2017/077680; 9 pages.
(Continued)

*Primary Examiner* — Ha Dinh Ho
(74) *Attorney, Agent, or Firm* — Maier & Maier, PLLC

(57) ABSTRACT

A method for operating a multi-clutch transmission for a motor vehicle, having at least the following steps: a) closing a first clutch of the multi-clutch transmission, in order to transfer an input torque (M_k1) between a drive machine of the motor vehicle and at least one first sub-transmission of the multi-clutch transmission; b) applying a drag torque (M_k2) to a second sub-transmission of the multi-clutch transmission, which is coupled to the first sub-transmission, via a second clutch of the multi-clutch transmission; c) detecting a clutch slip of the second clutch, which is dependent on the drag torque (M_k2); and d) determining a current gear selection of the multi-clutch transmission by evaluating the clutch slip. The disclosure further relates to a (Continued)

multi-clutch transmission and to a motor vehicle having a multi-clutch transmission.

9 Claims, 4 Drawing Sheets

(51) Int. Cl.
  *F16H 59/68* (2006.01)
  *F16H 59/46* (2006.01)
  *F16D 23/02* (2006.01)
  *F16H 1/20* (2006.01)
  *F16D 48/06* (2006.01)

(52) U.S. Cl.
  CPC .... *F16D 48/06* (2013.01); *F16D 2500/10412* (2013.01); *F16H 2059/465* (2013.01); *F16H 2059/6807* (2013.01); *F16H 2702/00* (2013.01)

(58) Field of Classification Search
  USPC .......................................... 74/330, 333, 335
  See application file for complete search history.

(56) References Cited

U.S. PATENT DOCUMENTS

| | | | |
|---|---|---|---|
| 10,369,981 B2 * | 8/2019 | Hedman | B60W 10/02 |
| 10,486,686 B2 * | 11/2019 | Meyer | B60W 30/184 |
| 10,556,594 B2 * | 2/2020 | Kim | F16H 61/04 |
| 10,745,001 B2 * | 8/2020 | Glück | B60K 6/387 |
| 2015/0000439 A1 | 1/2015 | Rohm | |
| 2015/0226324 A1 | 8/2015 | Gluckler et al. | |

FOREIGN PATENT DOCUMENTS

| | | |
|---|---|---|
| CN | 103978976 A | 8/2014 |
| CN | 104251304 A | 12/2014 |
| DE | 102006058973 A1 | 7/2007 |
| DE | 102007051064 B4 | 2/2010 |
| EP | 1439087 A2 | 7/2004 |
| EP | 2075492 A1 | 7/2009 |
| EP | 2447578 A1 | 5/2012 |
| WO | 2013026436 A1 | 2/2013 |

OTHER PUBLICATIONS

Examination Report dated Jul. 20, 2017 of corresponding German application No. 10 2016 221 698.8; 16 pages.
International Search Report and Written Opinion of the International Searching Authority dated Mar. 9, 2018 in corresponding International application No. PCT/EP2017/077680; 25 pages.
Office Action dated Mar. 17, 2020 in Chinese Application No. 201780068072.1; 10 pages including English-language translation.

* cited by examiner

METHOD FOR OPERATING A MULTI-CLUTCH TRANSMISSION, MULTI-CLUTCH TRANSMISSION FOR A MOTOR VEHICLE, AND MOTOR VEHICLE HAVING A MULTI-CLUTCH TRANSMISSION

FIELD

The disclosure relates to a method for operating a multi-clutch transmission for a motor vehicle. The multi-clutch transmission may include a plurality of clutches, for example a first clutch and a second clutch. Furthermore, the multi-clutch transmission may include a plurality of sub-transmissions, for example a first sub-transmission and a second sub-transmission. The multi-clutch transmission may further include a plurality of sub-transmission gears, which may be distributed over different sub-transmissions. The first clutch can be used, for example, to transmit a torque between a drive machine and the first sub-transmission, and the second clutch can be used to transmit a torque between the drive machine and the second sub-transmission. Other aspects of the invention relate to a multi-clutch transmission for a motor vehicle and a motor vehicle having such a multi-clutch transmission.

BACKGROUND

Such multi-clutch transmissions are widely used in the automotive sector and allow shifting between different gears almost without interruption in tractive force.

A fault detection method for automated motor vehicle transmissions is known from DE 10 2007 051 064 B4. Different torques are transmitted to respective branches of the transmission using two clutches, after which the method determines if a gear is engaged in both branches. A fault condition is determined if a gear is engaged in both branches and the sum total of the respective torques is greater than a reference value. The fault condition may for example be a strain condition in a drive train. The strain condition occurs if a clutch of a source gear is opened too late and/or a clutch of a target gear is engaged too early.

A method for controlling the operation of a parallel gear mechanism having two sub-transmissions, wherein a closed clutch is gradually opened while at the same time an open clutch of the parallel gear mechanism is gradually closed, is known from DE 10 2006 058 973 A1. During the gradual closing of the open clutch, an attempt is made to engage a current gear, and closing the clutch is stopped if this attempt fails.

A method for adjusting and controlling the clutch torque and engine torque during a shifting operation of a dual clutch transmission is known from EP 1 439 087 A2. The clutch torque is controlled during an entire shifting operation while the engine torque is only controlled as long as a clutch is securely closed.

It is the problem of the present invention to provide a method, a multi-clutch transmission, and a motor vehicle of the type mentioned at the outset in which gear shifting without interference and interruption in tractive force is made possible.

SUMMARY

The method according to the invention for operating a multi-clutch transmission for a motor vehicle includes at least the following steps:

a) closing a first clutch of the multi-clutch transmission in order to transfer an input torque between a drive machine of the motor vehicle and at least one first sub-transmission of the multi-clutch transmission; b) applying a drag torque to a second sub-transmission of the multi-clutch transmission, which is coupled to the first sub-transmission, via a second clutch of the multi-clutch transmission; c) detecting a clutch slip of the second clutch, which is dependent on the drag torque; and d) determining a current gear selection of the multi-clutch transmission by evaluating the clutch slip.

Due to the option to determine a current gear selection by evaluating the clutch slip, reliable determination if a sub-transmission gear is engaged and which sub-transmission gear is engaged can be performed even if position sensors are faulty, for example. In other words, in the event of position sensor failure it is still possible to determine reliably which sub-transmission gear(s) is/are engaged in the various sub-transmissions. While failure of position sensors can leave a vehicle immobilized in prior art systems, particularly if a position sensor associated with a reverse gear of a sub-transmission is faulty, the method according to the invention can maintain full gear availability of individual sub-transmission gears of the respective sub-transmissions. Therefore, gear shifting without interference and interruption in tractive force is made possible, at least to a large extent, even if such position sensors fail.

The multi-clutch transmission may for example be a dual clutch transmission having a plurality of gears, including at least one reverse gear. Respective gears of the multi-clutch transmission will hereinafter also be called sub-transmission gears. The term "gear" or "sub-transmission gear", as used hereinafter, is a coupling of torque-transmitting components by means of which various transmission stages may be implemented. Such torque-transmitting components may for example be gear wheels which represent a transmission stage and a gear when engaging in each other. The gears can be engaged using so-called gear selectors, such that a form-fitting connection can be achieved between a gear wheel and a transmission shaft of the sub-transmission. When gears are engaged using such gear selectors, so-called sliding sleeves can be used with which a gear selector force for engaging the gears can be applied.

The term "closing" the first clutch can particularly mean complete closing of the first clutch. Depending on the clutch embodiment, complete closing can for example mean that the clutch plates of the first clutch are pressed against each other while minimizing a clutch slip of the first clutch. Such minimizing of the clutch slip at the first clutch allows highly efficient torque transmission. When operating the multi-clutch transmission, an input torque can be transmitted between the drive machine and the respective sub-transmission in the multi-clutch transmission by means of the respective clutches. The drive machine may to this end be connected to an input shaft of the multi-clutch transmission. The first and the second clutches may also be mounted to this input shaft. The first clutch may be associated with the first sub-transmission of the multi-clutch transmission. The first sub-transmission may include a plurality of gears (sub-transmission gears). The first sub-transmission may for example include the gears with an odd gear number, such as gears 1, 3, 5, 7, and optionally other gears having an odd gear number. The second clutch may be associated with the second sub-transmission of the multi-clutch transmission. The second sub-transmission may include the remaining gears of the multi-clutch transmission. The second sub-transmission may for example include the gears with an even gear number, such as gears 2, 4, 6, and optionally other gears having an even gear number. It is understood that the first sub-transmission may include the even and the second sub-transmission may include the odd gears. Furthermore, one of the sub-transmissions may include the reverse gear. The reverse gear may for example be associated with the second sub-transmission. In principle, multiple reverse gears may be provided, such that for example a first reverse gear can be associated with the one sub-transmission and a second reverse gear can be associated with the second sub-transmission.

The first sub-transmission and the second sub-transmission may for example be coupled to each other via a gear wheel on a transmission output shaft. When operating the multi-clutch transmission, the transmission output shaft can—depending on a current transmission ratio—be driven by switching in one of the two sub-transmissions through closing the respective clutch. The drag torque can be applied by transmitting said drag torque from the second clutch to the second sub-transmission, from there to the transmission output shaft, and via the transmission output shaft to the first sub-transmission. The drag torque can thus counteract the drive torque. The drag torque can be applied while the first clutch is fully closed. This advantageously allows undisrupted transmission of torque by means of the first clutch. Such "undisrupted torque transmission" can largely prevent a torque breakdown or even an interruption of tractive force, which could occur if a clutch is only partially engaged and thus adapted for slip operation.

When the current gear selection of the multi-clutch transmission is determined by evaluating the clutch slip, it can be detected if multiple gears (one sub-transmission gear in each of the sub-transmissions) are engaged or not. This can also be done when the motor vehicle is stationary. At a standstill of the vehicle, the transmission output shaft may be blocked by an electronic parking brake or by another brake. In other words, the gear selection can be determined even if the motor vehicle is at a standstill. This allows starting from a standstill in a predetermined engaged gear even if the position sensors have failed. Despite a faulty position sensor, starting in a second or third sub-transmission gear on a smooth road surface (e.g. on black ice) is possible, and spinning of drive wheels can advantageously be prevented. The clutch slip can for example be evaluated by comparing the clutch slip to a predetermined gear-dependent and additionally or alternatively rotational speed-dependent clutch slip value. The clutch slip value can be part of a characteristic slip value diagram and for example be kept and thus stored in a memory of a control device of the multi-clutch transmission.

In summary, it is a particular advantage of the method, process according to the invention that is enables gear selection without position sensors. The gear selection can be inferred from the clutch slip even if the position sensors are faulty. This allows particularly fail-safe operation of the multi-clutch transmission, and the risk of breakdown can be considerably reduced. Particularly, gear availability is ensured even with defaulted position sensors in the multi-clutch transmission.

In an advantageous embodiment of the invention, the drag torque is kept constant by applying a torque to the second sub-transmission in step b). Thus the drag torque is kept at a constant drag torque value. This is an advantage because keeping this value constant can effectively prevent any interferences, such as angular accelerations or rotational lags of transmission shafts of the multi-clutch transmission, which would aggravate or at least delay the determination of the current gear selection. Keeping the drag torque constant thus allows a reduction in any interferences, at least on the clutch side, during a subsequent determination of the current gear selection of the multi-clutch transmission.

In another advantageous embodiment of the invention, the drag torque is greater than a threshold torque, which characterizes a gripping point of the second clutch. This is an advantage because it can be assumed that setting the drag torque to a drag torque value which is greater than the threshold torque ensures reliable torque transmission of the drag torque by the second clutch. This ensures particularly reliable determination of the gear selection. The gripping point and thus the threshold torque characterizing the gripping point may differ in magnitude depending on clutch design. The threshold torque can thus be in the range from 5 Nm to 10 Nm. Advantageously, an amount of the drag torque is by 2 nm to 5 Nm greater than the threshold torque. In this way, the threshold torque can be exceeded to an extent sufficient for reliably determining the gear selection on the one hand, and on the other hand clutch slip occurs at such amounts even at a low power expenditure of the drive machine.

In another advantageous embodiment of the invention, the method includes determining whether a sub-transmission gear is engaged in each of the first and second sub-transmissions as part of determining the current gear selection by evaluating the clutch slip in step d). This is an advantage because it can be determined if and how the sub-transmission gear is engaged. For example, this allows an evaluation whether the sub-transmission gear is engaged in a form-fitting manner. In other words, a determination can be made whether the sub-transmission gear is safely engaged in a form-fitting manner. Form-fitting engagement of the respective gear can be assumed if a shaft speed associated with the gear corresponds to an associated synchronous speed. The shaft speed does not deviate from the respective synchronous speed if the gear is engaged in a form-fitting manner. In summary, step d) can determine if a sub-transmission gear is engaged in the first sub-transmission and another sub-transmission gear is engaged in the second sub-transmission. For example, the third gear can be engaged as sub-transmission gear in the first sub-transmission and the fourth gear can be engaged as the other sub-transmission gear in the second sub-transmission, to mention just one example.

In another advantageous embodiment of the invention, at least one sub-transmission gear engaged in the first or in the second sub-transmissions is identified using a synchronous speed characterizing the sub-transmission gear if the sub-transmission gear to be identified is engaged. It is assumed here the one sub-transmission gear is engaged in each of the sub-transmissions. In general, closing the first clutch can "activate" the first sub-transmission, and accordingly a torque can be transmitted from the input shaft (driven by the drive machine) via a first clutch and the respective engaged and active sub-transmission gear of the first sub-transmission to the output shaft of the multi-clutch transmission. When the transmission ratio of the sub-transmission gear currently engaged in the "active" sub-transmission (in this example the first sub-transmission), a rotational speed sensor which can capture the rotational speed of the input shaft can determine if a gear is engaged in the active first sub-transmission and which gear it is. To ensure that the input shaft does not accidentally rotate synchronously with a theoretically possible transmission ratio, the second clutch of the second sub-transmission can be used to apply the drag torque. Such "accidental" co-rotation can for example be caused by bearing friction effects or by activated clutch cooling (flushing the clutch with oil for cooling, which causes rotational movements). In other words, such "accidental" co-rotation can be random, undefined dragging along at speed "0" and a driving speed of the drive machine, which theoretically and "accidentally" could correspond to a synchronous speed. The drag torque can be conducted to the input shaft by means of the second sub-transmission, the output shaft, the first sub-transmission, and the first clutch. If the rotational speed of the input shaft does not change as a result of the drag torque, this indicates that a sub-transmission gear to be identified is engaged in the second sub-transmission. An engaged gear prevents deceleration or acceleration of the second sub-transmission even if a drag torque is applied thereto. The sub-transmission gear of the second sub-transmission identified as engaged can then be disengaged in an uncontrolled manner by means of the respective gear selectors.

A disengaged gear (in the example described: of the second sub-transmission) can be reliably identified if the clutch slip at the second clutch decreases at a drag torque that is set to remain constant. The drag torque causes deceleration or acceleration of the second sub-transmission when the gear is disengaged. To engage a desired target gear (for example another sub-transmission gear of the second sub-transmission) in an uncontrolled manner, the drag torque at the second clutch can be reduced and set, for example, to the value "0". In other words, the second clutch can be fully opened and eliminate the drag torque as soon as the gear of the second sub-transmission that was identified as engaged has been disengaged.

The term "identify" typically means assigning a gear number to the respective sub-transmission gear to be identified. In the identification process, the respective engaged gear may be identified, for example, as second gear or fourth gear, to name just a few examples. "Identifying" can be performed by evaluating the input shaft speed determined by the rotational speed sensor and using the known transmission ratio of each of the gears of the multi-clutch transmission. In summary, the rotational speed sensor can measure an input shaft speed achieved when a sub-transmission gear is engaged in the operation of the multi-clutch transmission, and the input shaft speed can then be offset against a sub-transmission gear ratio characterizing the sub-transmission gear. A resulting value can be compared to a synchronous speed of the respective sub-transmission gear which is stored, for example, in a control device (which may be configured as a transmission control device) to identify the sub-transmission gear.

In another advantageous embodiment of the invention, the current gear selection is changed in an additional step e) depending on the identification of the engaged sub-transmission gear by engaging a sub-transmission gear which is different from the engaged sub-transmission gear. Particularly, a gear of the respective other, "passive" sub-transmission can be engaged to avoid any gear steps and achieve operation at a high transmission efficiency. A "passive" sub-transmission means that this sub-transmission is currently "inactive" with respect to transmitting a torque from the input shaft via the currently "active" sub-transmission to the output shaft and therefore does not influence torque transmission at all or only in the form of "co-rotating" the shafts (e.g. due to bearing friction) of the passive sub-transmission.

For example, if the first gear which may be located on the first sub-transmission is identified as the gear which is currently engaged, engaging a second gear of the second sub-transmission, for example, as the sub-transmission gear which is different from the currently engaged gear, can avoid such a gear step. Such an unfavorable gear step can occur, for example, when shifting from a second to a fourth gear, that is, when skipping the third gear, which can happen in prior art systems in the event of failure of a position sensor.

In another advantageous embodiment of the invention, the method is performed with an output shaft of the multi-clutch transmission which is blocked from rotational movement. In other words, the method can also be performed when the motor vehicle is stationary, wherein the output shaft may for example be blocked from rotational movement by an electronic parking brake or another vehicle brake. In this advantageous manner, the current gear selection can be detected reliably even if position sensors are faulty.

A second aspect of the invention relates to a multi-clutch transmission for a motor vehicle having a first sub-transmission, a first clutch which can be closed for transmitting an input torque between a drive machine of the motor vehicle and at least the first sub-transmission of the multi-clutch transmission, having a second sub-transmission, which is coupled to the first sub-transmission, and a second clutch for transmitting the input torque between the drive machine and the second sub-transmission. According to the invention, a control device is provided which is configured to actuate at least the second clutch for applying a drag torque at least to the second sub-transmission by means of the second clutch while the first clutch is closed, wherein the control device can be used to determine a clutch slip of the second clutch which depends on the drag torque and a current gear selection of the multi-clutch transmission by evaluating the clutch slip. The control device can actuate the first clutch such that it is fully closed and actuate the second clutch such that it applies the drag torque while the first clutch is closed. This advantageously allows detection of the current gear selection without position sensors. Therefore, gear shifting without interference and interruption in tractive force is made possible, at least to a large extent, even if position sensors are defective (have failed). The control device can be configured to actuate the second clutch such that the second clutch keeps the drag torque constant. This allows particularly trouble-free evaluation of the clutch slip.

In an advantageous embodiment of the invention, the multi-clutch transmission is a dual clutch transmission. Such a dual clutch transmission can provide gear shifting to various gears of the multi-clutch transmission, which shifting is largely free of interruptions in tractive force.

A third aspect of the invention relates to a motor vehicle having such a multi-clutch transmission. Such a motor vehicle allows shifting to various gears of the multi-clutch transmission, which shifting is largely free of interference and interruptions in tractive force.

Advantageous designs and preferred embodiments of the method are also considered advantageous designs and preferred embodiments of the multi-clutch transmission according to the invention and the motor vehicle according to the invention and vice versa.

The features and feature combinations mentioned above in this description as well as the features mentioned in the description of the figures below and/or shown in the figures alone are not just usable in the respective combination mentioned, but can be used as well in other combinations and alone without deviating from the scope of the invention.

Other advantages, features, and details of the invention can be derived from the following description of preferred embodiments and from the drawings.

BRIEF DESCRIPTION OF THE DRAWINGS

The invention is explained once more below with reference to a specific exemplary embodiment. Wherein.

DETAILED DESCRIPTION

In direct shift transmissions (dual clutch transmissions) known from prior art, gear positions when engaging and disengaging gears and adjusting and control processes when shifting gears are monitored using suitable sensors, such as position sensors. If a sensor fault occurs, it is common that an affected sub-transmission with which the faulty sensor is associated is blocked by no longer actuating a clutch associated with this sub-transmission, which thus remains open, and the respective gears of said sub-transmission are moved into a neutral position, i.e. disengaged, if possible. One reason for blocking such a sub-transmission affected (by the fault) is that prior art systems cannot detect if more than one gear is engaged in the sub-transmission with the faulty sensor. If more than one gear per sub-transmission is engaged, there is the great risk that the multi-clutch transmission blocks itself by means of the toothing of the gear wheels which are in engagement.

In systems known so far, a client cannot use any of the gears of the affected sub-transmission (having the at least one faulty sensor). If a reverse gear is disposed on the affected sub-transmission, it is no longer available, which from a client's point of view can often result in a breakdown of the motor vehicle.

Even if position sensors are faulty, the present invention makes it possible to detect if a gear is engaged or not in a transmission affected by the fault by means of targeted control of clutches and gear selectors. Despite such a fault (position sensor failure), gear availability can largely or even fully be maintained, and gear steps can be avoided.

Figure 1:
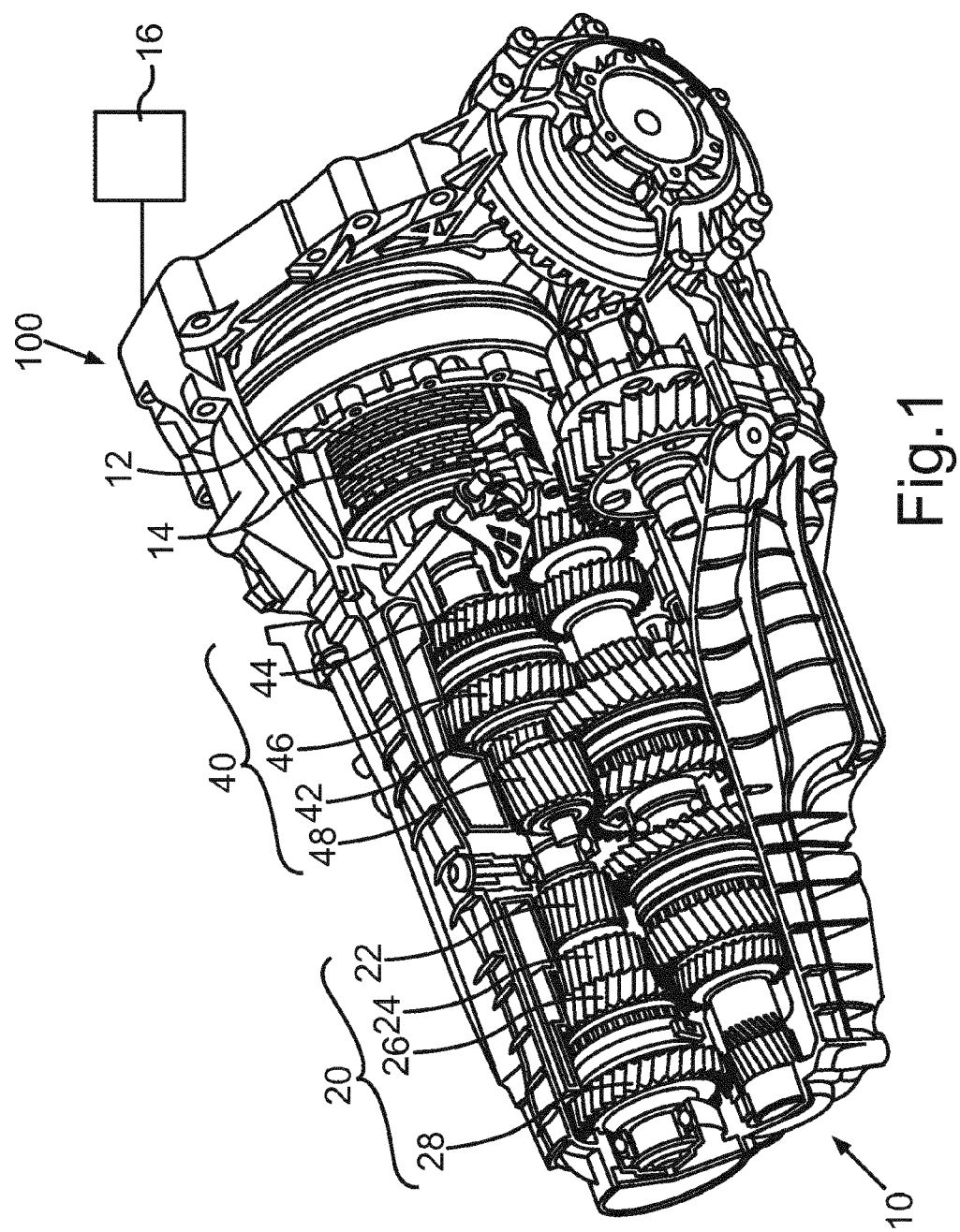
FIG. 1 shows a partial sectional view of a multi-clutch transmission as an example of the invention, which is configured as a dual clutch transmission installed in a motor vehicle.

FIG. 1 shows a sectional view of a multi-clutch transmission 10 configured as a dual clutch transmission, which is disposed in a motor vehicle 100. The multi-clutch transmission 10 includes a first sub-transmission 20 having a first gear 22, a third gear 24, a fifth gear 26, and a seventh gear 28. The multi-clutch transmission 10 further includes a second sub-transmission 40 having a second gear 42, a fourth gear 44, a sixth gear 46, and a reverse gear 48. In order to transmit an input torque $M\_k1$ (see FIGS. 2c and 3c) between a drive machine not shown here of the motor vehicle 100 and an output shaft of the multi-clutch transmission 10 also not shown here for driving the motor vehicle 100, the first sub-transmission 20 can be coupled via a first clutch 12 and the second sub-transmission 40 can be coupled via a second clutch 14 of the multi-clutch transmission 10 in a torque-transmitting manner to a drive shaft, which may be connected to the drive machine. The drive shaft may be configured as a transmission input shaft, for example. The transmission input shaft can be coupled to the output shaft in a torque-transmitting manner via the first sub-transmission 20 by means of the first clutch 12 and via the second sub-transmission 40 by means of the second clutch 14, respectively. In addition, a control device 16 is provided, which is configured as a transmission control device in the exemplary embodiment shown here. The control device 16 is configured to actuate at least the second clutch 14, such that the second clutch 14 applies a drag torque $M\_k2$ at least to the second sub-transmission 40 while the first clutch 12 is closed. The control device 16 allows detection of a clutch slip of the second clutch 14, which clutch slip depends on the drag torque $M\_k2$, and allows determination of a current gear selection of the multi-clutch transmission 10 by evaluating said clutch slip.

FIGS. 2a to 2d each show diagrams which illustrate an operation of the multi-clutch transmission 10 when the motor vehicle 100 is in movement. FIGS. 3a to 3b each show diagrams which illustrate the operation of the multi-clutch transmission 10 when the motor vehicle 100 is stationary.

Figure 2A:
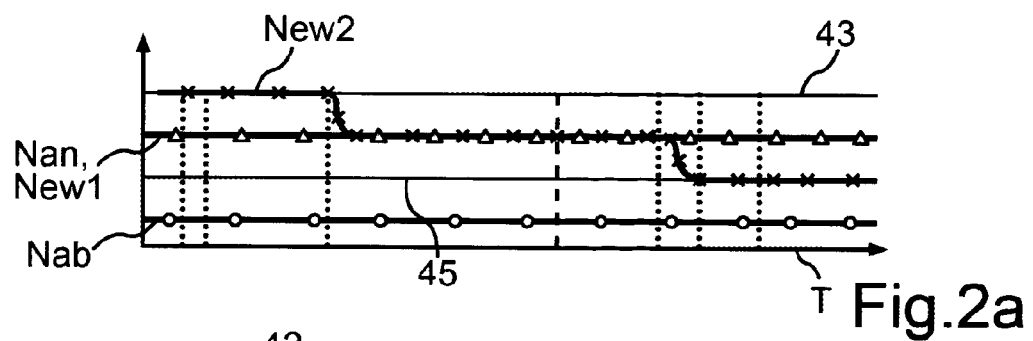
FIG. 2a is a diagram showing a shaft speed over time, a gear position over time, a clutch torque over time, and a gear selector force over time during the operation of the multi-clutch transmission in a motor vehicle in movement.
Figure 3A:
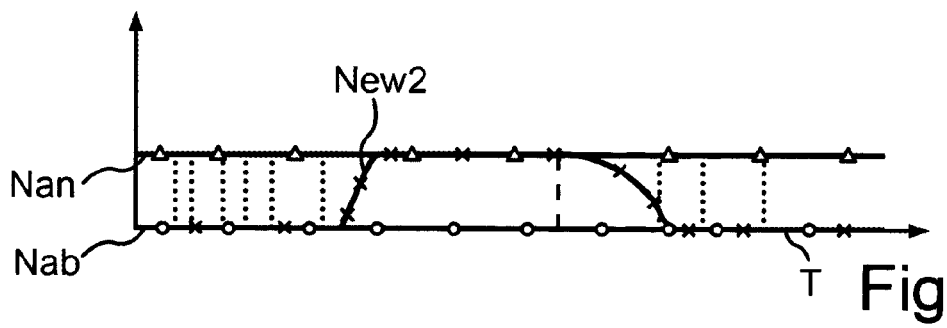
FIG. 3a is a diagram showing a shaft speed over time, a gear position over time, a clutch torque over time, and a gear selector force over time during the operation of the multi-clutch transmission in a stationary motor vehicle.
Figure 3B:
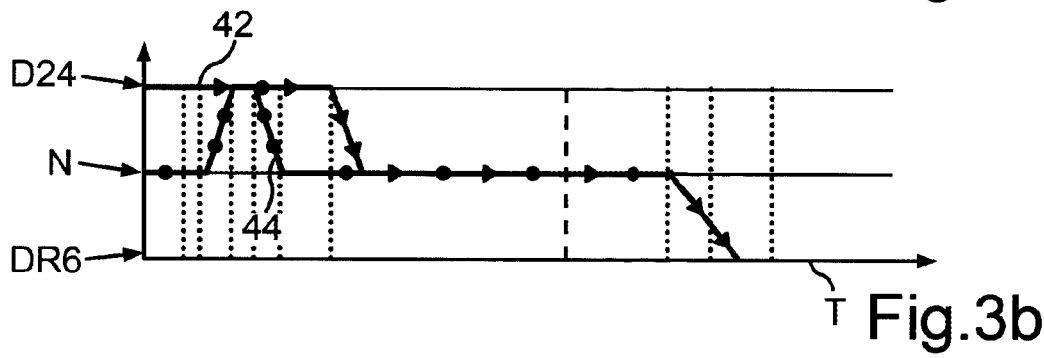
FIG. 3b is a diagram showing a shaft speed over time, a gear position over time, a clutch torque over time, and a gear selector force over time during the operation of the multi-clutch transmission in a stationary motor vehicle.

FIG. 2a and FIG. 3a each show diagrams in which the respective shaft speeds are plotted over a time T. These diagrams show an input speed Nan, wherein said input speed Nan is specified by a drive machine of the motor vehicle 100 which is coupled to the multi-clutch transmission 10. The drive machine can either be an internal combustion engine of an electric motor, to name just a few examples.

Since FIG. 2a shows the motor vehicle 100 in movement, the input speed Nan—as shown in the present embodiment—may correspond to a speed New1 at the input shaft when the first sub-transmission 20 is activated for driving the motor vehicle 100, that is, when said sub-transmission is connected by means of the first clutch 12. FIG. 2a shows an example of a shifting operation from the second gear 42 to the fourth gear 44 of the second sub-transmission 40. Starting from a synchronous speed 43 of the second gear 42, first a speed New2 of the second sub-transmission 40 is adjusted to the input speed Nan, then the speed New2 is adjusted to a synchronous speed 45 of the fourth gear 44. The synchronous speeds can also be called synchronizing speeds in this context. FIG. 2a and FIG. 3a also show a plot of an output speed Nab of the output shaft of the multi-clutch transmission 10.

Figure 2B:
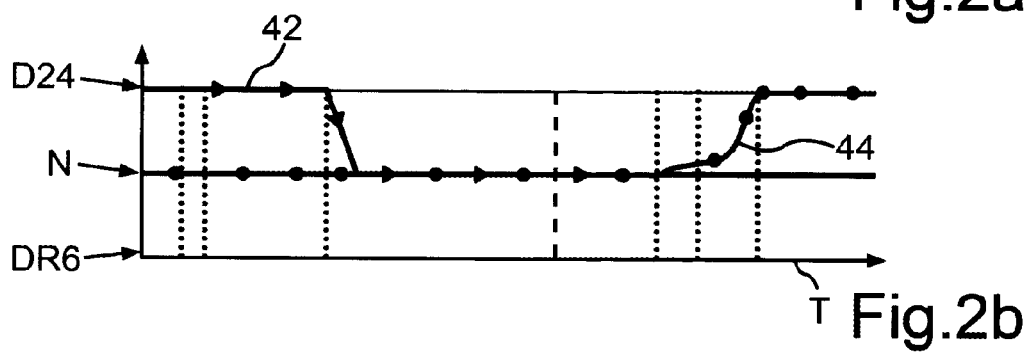
FIG. 2b is a diagram showing a shaft speed over time, a gear position over time, a clutch torque over time, and a gear selector force over time during the operation of the multi-clutch transmission in a motor vehicle in movement.

FIG. 2b and FIG. 3b each show gear positions over the time T. Herein, the second gear 42 is shifted from an engaged position D24 of the second gear 42 or the fourth gear 44, respectively, into a neutral position N. In addition, the fourth gear 44 is shifted from its neutral position N to the engaged position D24. Furthermore, the engaged position DR6 of the reverse gear 48 or the sixth gear 46, respectively, is shown.

Figure 2C:
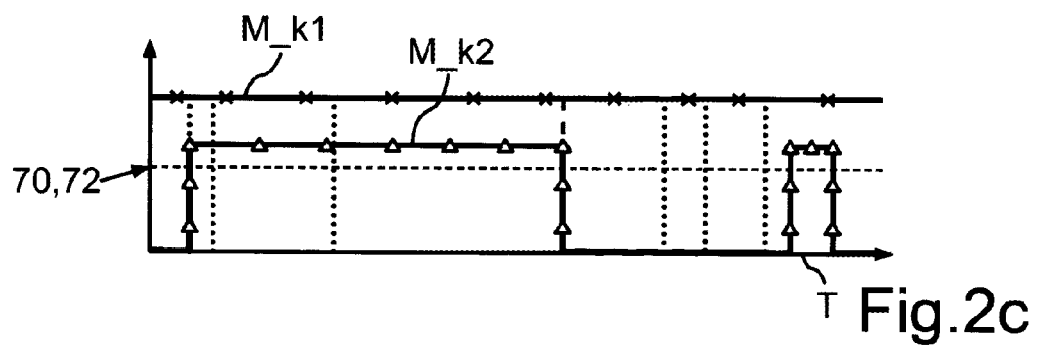
FIG. 2c is a diagram showing a shaft speed over time, a gear position over time, a clutch torque over time, and a gear selector force over time during the operation of the multi-clutch transmission in a motor vehicle in movement
Figure 3C:
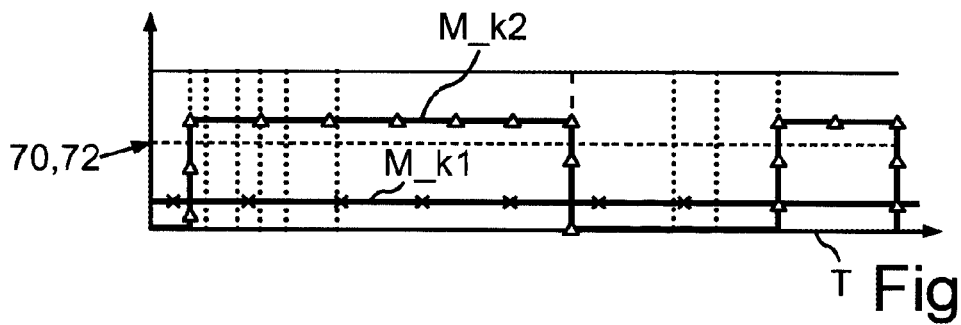
FIG. 3c is a diagram showing a shaft speed over time, a gear position over time, a clutch torque over time, and a gear selector force over time during the operation of the multi-clutch transmission in a stationary motor vehicle.

FIG. 2c and FIG. 3c each show clutch torques over the time T. FIG. 2c and FIG. 3c each show the introduction of the input torque M_k1 into the multi-clutch transmission 10 by closing the first clutch 12. The second clutch 14 applies the drag torque M_k2, wherein a drag torque value of the drag torque M_k2 is set to a constant value above a gripping point 70 of the second clutch 14. A threshold torque 72 which characterizes the gripping point 70 is currently assigned to the same. When exceeding the threshold torque 72, reliable torque transmission by the second clutch 14 can be assumed.

Figure 2D:
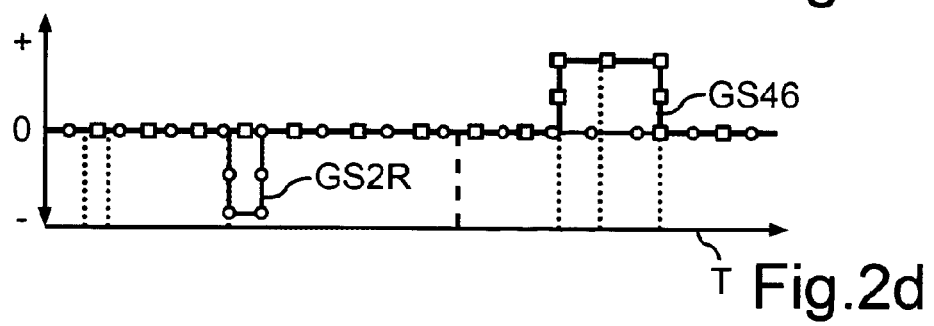
FIG. 2d is a diagram showing a shaft speed over time, a gear position over time, a clutch torque over time, and a gear selector force over time during the operation of the multi-clutch transmission in a motor vehicle in movement
Figure 3D:
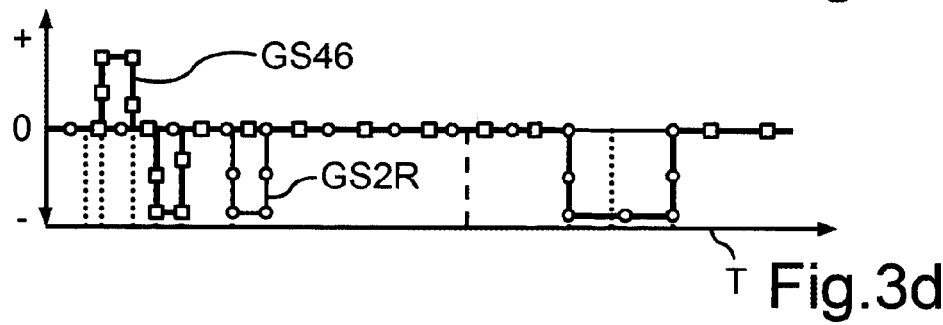
FIG. 3d is a diagram showing a shaft speed over time, a gear position over time, a clutch torque over time, and a gear selector force over time during the operation of the multi-clutch transmission in a stationary motor vehicle.

FIG. 2d and FIG. 3d each show a gear selector force and a gear selector direction as a function of the time T. A sliding sleeve force GS2R of a gear selector can be applied for engaging the second gear 22 or the reverse gear 48, respectively. Furthermore, another sliding sleeve force GS46 of another gear selector can be applied for engaging the fourth gear 44 or the sixth gear 46, respectively.

Figure 4:
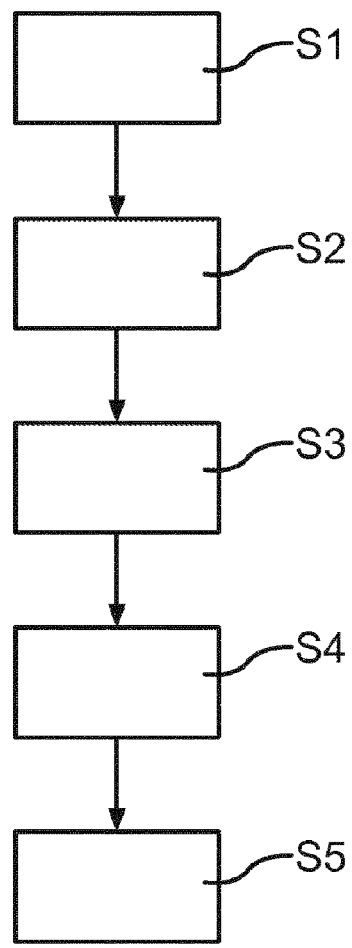
FIG. 4 is a flow diagram showing individual process steps as an example of the method according to the invention.

FIG. 4 shows three exemplary steps of the method according to the invention, wherein the first clutch 12 of the multi-clutch transmission 10 is closed in step S1 to transmit the input torque M_k1 between the drive machine of the motor vehicle 100 and the first sub-transmission 20 of the multi-clutch transmission 10.

In step S2, the second clutch 14 of the multi-clutch transmission 10 applies the drag torque M_k2 to the second sub-transmission 40 of the multi-clutch transmission 10 which is coupled by means of the output shaft to the first sub-transmission 20. The drag torque M_k2 is kept constant while applied to the second sub-transmission 40. Furthermore, the drag torque M_k2 is greater than the threshold torque 72, which characterizes the gripping point 70 of the second clutch 14.

In step S3, the clutch slip of the second clutch 14, which is dependent on the drag torque M_k2, is detected and in step S4 the current gear selection of the multi-clutch transmission 10 is determined by evaluating the clutch slip.

When determining the current gear selection by evaluating the clutch slip, it is determined if a sub-transmission gear 22, 24, 26, 28, 42, 44, 46, 48 is engaged in each of the first sub-transmission 12 and the second sub-transmission 14. In addition, the sub-transmission gear 22, 24, 26, 28, 42, 44, 46, 48 engaged in the first sub-transmission 12 or in the second sub-transmission 14 is identified by checking the respective synchronous speed which characterizes the sub-transmission gear 22, 24, 26, 28, 42, 44, 46, 48. For reasons of clarity, FIG. 2a just shows the synchronous speed 43 of the second gear 42 and the synchronous speed 45 of the fourth gear 44, but it is obvious that a respective synchronous speed may be assigned to each sub-transmission gear 22, 24, 26, 28, 42, 44, 46, 48, even if this is not explicitly shown.

In another step S5, the current gear selection is changed depending on the identification of the engaged sub-transmission gear 22, 24, 26, 28, 42, 44, 46, 48 by engaging a sub-transmission gear 22, 24, 26, 28, 42, 44, 46, 48 which differs from the engaged sub-transmission gear 22, 24, 26, 28, 42, 44, 46, 48.

To summarize, we will once again describe the detection of the respective engaged gear 22, 24, 26, 28, 42, 44, 46, 48 when the vehicle is in movement (see FIGS. 2a to 2d). When the vehicle is moving, the rotational speed sensor on the input shaft with a known transmission ratio of the multi-clutch transmission 10 can be used to detect which gear 22, 24, 26, 28, 42, 44, 46, 48 is engaged in the respective sub-transmission 20, 40. To make sure that the input shaft does not accidentally rotate in sync with a possible gear ratio, the passive driving clutch (here: the second clutch 14) of the sub-transmission affected by a position sensor fault (here: the second sub-transmission 40) can be used to adjust the input shaft to the drag torque M_k2. If the rotational speed does not change in this process, a gear is engaged in the affected sub-transmission. A gear detected as engaged can specifically be disengaged in an uncontrolled manner by means of the respective gear selectors.

A disengaged gear can safely be detected if the clutch slip at the passive clutch (here: the second clutch 14) decreases significantly while the drag torque M_k2 continues to be constant The drag torque M_k2 at the passive clutch can now be reduced, then a desired target gear can be engaged in an uncontrolled manner using the respective gear selectors. A calculated synchronous speed can again be used to check if the target gear is engaged. To make sure that the gear is engaged in a form-fitting manner, a specific drag torque can again be set at the passive clutch. The shaft speed then coincides with the synchronous speed.

Detection of a gear selection when the output shaft of the multi-clutch transmission 10 is blocked from rotational movement can be summarized as follows: When the motor vehicle 100 is stationary, the synchronous speed of all gears can match the value "0". The method according to the invention can still be used to detect if a gear is engaged or not. To prevent undesired movement of the motor vehicle 100 while the gear selection is detected, the motor vehicle 100 can first be fixed by requesting an electronic parking brake or a service brake of the motor vehicle 100. To detect if a gear is engaged or not in the affected sub-transmission, a permanent clutch slip in the amount of the input speed Nan can be set at the respective clutch by applying the defined drag torque M_k2 to the respective clutch. A gear is engaged in the affected sub-transmission if the input shaft speed remains constant at a value "0". No gear is engaged in the sub-transmission if the shaft rotates in sync with the input speed Nan, or if the clutch slip between the input shaft speed and the input speed Nan is smaller than a specified threshold value. If a gear is engaged in the sub-transmission, an attempt can be made to disengage a gear in an uncontrolled manner by using the gear selectors one after the other while keeping the set torque. As soon as the input shaft speed leaps to the input speed, it can be assumed that no gear is engaged any more in the sub-transmission. The torque at the clutch at the same time prevents engaging a gear unintentionally on an opposing gear selector side, since synchronization against the rotating input shaft can be mechanically prevented by means of locking synchronization. Subsequently, the desired gear can be engaged in an uncontrolled manner after opening the drive clutch.

The invention claimed is:

1. A method for operating a multi-clutch transmission for a motor vehicle, comprising at least the following steps:
   a) closing a first clutch of the multi-clutch transmission to transmit an input torque (M_k1) between a drive machine of the motor vehicle and at least a first sub-transmission of the multi-clutch transmission;
   b) applying a drag torque (M_k2) to a second sub-transmission of the multi-clutch transmission which is coupled to the first sub-transmission by means of a second clutch of the multi-clutch transmission;

c) detecting a clutch slip of the second clutch, which slip depends on the drag torque ($M\_k2$); and
d) determining a current gear selection of the multi-clutch transmission by evaluating said clutch slip,
wherein the drag torque ($M\_k2$) is kept constant while applied to the second sub-transmission in step b).

2. The method according to claim 1, wherein the drag torque ($M\_k2$) is greater than the threshold torque, which characterizes a gripping point of the second clutch.

3. The method according to claim 1, wherein, when determining the current gear selection by evaluating the clutch slip in step d), it is determined if a sub-transmission gear is engaged in each of the first sub-transmission and the second sub-transmission.

4. The method according to claim 3, wherein identifying at least one sub-transmission gear engaged in the first sub-transmission or in the second sub-transmission using a synchronous speed which characterizes the sub-transmission gear is carried out when the sub-transmission gear to be identified is engaged.

5. The method according to claim 4, further comprising:
e) changing the current gear selection depending on the identification of the engaged sub-transmission gear by engaging a sub-transmission gear which differs from the engaged sub-transmission gear.

6. The method according to claim 1, wherein the method is performed when the output shaft of the multi-clutch transmission is blocked from rotational movement.

7. A multi-clutch transmission for a motor vehicle, comprising:
a first sub-transmission,
a first clutch which can be closed for transmitting an input torque ($M\_k1$) between a drive machine of the motor vehicle and at least the first sub-transmission of the multi-clutch transmission,
a second sub-transmission, which is coupled to the first sub-transmission, and
a second clutch for transmitting the input torque ($M\_k1$) between the drive machine and the second sub-transmission,
wherein a control device is provided, which is configured to actuate at least the second clutch for applying a constant drag torque ($M\_k2$) at least to the second sub-transmission by means of the second clutch while the first clutch is closed, and
wherein a clutch slip of the second clutch which depends on the drag torque ($M\_k2$) and a current gear selection of the multi-clutch transmission by evaluating said clutch slip is determined.

8. The multi-clutch transmission according to claim 7, wherein the multi-clutch transmission is a dual clutch transmission.

9. A method for operating a multi-clutch transmission for a motor vehicle, comprising at least the following steps:
a) closing a first clutch of the multi-clutch transmission to transmit an input torque ($M\_k1$) between a drive machine of the motor vehicle and at least a first sub-transmission of the multi-clutch transmission;
b) applying a drag torque ($M\_k2$) to a second sub-transmission of the multi-clutch transmission which is coupled to the first sub-transmission by means of a second clutch of the multi-clutch transmission;
c) detecting a clutch slip of the second clutch, which slip depends on the drag torque ($M\_k2$); and
d) determining a current gear selection of the multi-clutch transmission by evaluating said clutch slip,
wherein, when determining the current gear selection by evaluating the clutch slip in step d), it is determined if a sub-transmission gear is engaged in each of the first sub-transmission and the second sub-transmission, and
wherein identifying at least one sub-transmission gear engaged in the first sub-transmission or in the second sub-transmission using a synchronous speed which characterizes the sub-transmission gear is carried out when the sub-transmission gear to be identified is engaged.

\* \* \* \* \*